United States Patent [19]

Stange et al.

[11] 4,116,431

[45] Sep. 26, 1978

[54] METHOD FOR TRANSPORTING AND REGISTERING STACKED SHEETS

[75] Inventors: Klaus K. Stange, Pittsford; Richard E. Smith, Webster; Thomas J. Hamlin, Macedon; James R. Cassano, Penfield, all of N.Y.

[73] Assignee: Xerox Corporation, Stamford, Conn.

[21] Appl. No.: 809,952

[22] Filed: Jun. 27, 1977

Related U.S. Application Data

[62] Division of Ser. No. 627,572, Oct. 31, 1975.

[51] Int. Cl.² .............................................. B65H 9/00
[52] U.S. Cl. ....................................... 271/236; 271/195
[58] Field of Search ............... 271/194, 195, 211, 226, 271/234, 236, 250, 251, 264; 302/31

[56] References Cited

U.S. PATENT DOCUMENTS

| | | | |
|---|---|---|---|
| 1,107,859 | 8/1914 | Stevens | 271/211 |
| 3,405,977 | 10/1968 | Albright | 271/195 |
| 3,624,807 | 11/1971 | Schwebel | 271/236 |
| 3,731,823 | 5/1923 | Goth | 302/31 |
| 3,834,799 | 9/1974 | Blosser et al. | 271/74 X |
| 3,918,706 | 11/1975 | Craft | 271/250 |

*Primary Examiner*—Robert W. Saifer

[57] ABSTRACT

A method for registering a stack of sheets with respect to perpendicularly related axes includes the steps of providing a first sleeve for accommodating the stack of sheets; providing a stop at one end of the sleeve; placing the stack in the sleeve; and providing in the sleeve a fluid stream, whereby the fluid stream moves the sheets down the sleeve in unison and moves the sheets into registration with a wall of the sleeve and the stop. In a modified method a second sleeve is provided in alignment with and adjacent to said first sleeve. The sheets are first placed inside the second sleeve and fluid is drawn from the first sleeve to move the stack. Assistance in moving the stack is provided by fluid injected into the second sleeve, care being taken to prevent a net flow of air out of a gap between the first and second sleeves.

4 Claims, 5 Drawing Figures

METHOD FOR TRANSPORTING AND REGISTERING STACKED SHEETS

This is a divisional of application Ser. No. 627,572, filed Oct. 31, 1975.

The subject invention generally relates to a pneumatic method for moving articles, in unison, along a transport and, in particular, to a method for moving a plurality of stacked articles, such as paper sheets, into registration.

The use of fluid to move articles into registration with stops is a part of the prior art which is relevant herein. In fact, such use of fluids is disclosed in U.S. Pat. No. 3,588,096, issued to Leigh D. Leiter on June 28, 1971. More particularly, the patent discloses apparatus wherein fabric is delivered to a horizontally disposed support including recessed areas housing upwardly pointed nozzles. The nozzles are aligned in two different directions, and the nozzles pointing in one direction are alternately actuated with respect to the nozzles pointing in the other direction to move the fabric into registration in perpendicular directions. Further, the use of fluids for rectilinearly moving an article within a conduct or chamber is also known. In fact, this concept is disclosed in U.S. Pat. No. 3,422,411, issued to J. E. Smith, Jr., on Jan. 14, 1969. More specifically, this patent discloses a data storage cartridge which has an enclosed transfer chamber housing a data storage card. Air pressure and vacuum pressure are switched between opposite ends of the chamber to reciprocally move the card rectilinearly in the chamber. As is disclosed in U.S. Pat. No. 3,550,964, issued to C. E. Spyropoulus on Dec. 29, 1970, fluidic systems for transporting items along a guide path in serial fashion are known.

It is noted that with the apparatus disclosed by Leigh D. Leiter as fabric is advanced, or when fabric which is smaller than the distance between nozzles is to be registered, some of the nozzles discharge into the surrounding air without having any effect on the fabric as it is moved into registration. Thus, pressurized air is wasted. In addition, it is noted that in the system disclosed by J. E. Smith, Jr., lateral registration is provided by the distance between walls of the chamber which are parallel to the direction of travel of the storage card. Therefore, the system cannot be used with cards having different width dimensions. The Spyropoulus patent teaches that a plurality of articles should be transported serially to avoid bunching or blockage within a guide path. As will appear, this concept is at odds with applicant's invention.

It is an object of the present invention to provide a fluidic method for moving a plurality of stacked sheets in unison within a guide path.

It is another object of the present invention to provide a method for efficiently moving one or more sheets into registration with perpendicularly relates axes.

Briefly, the invention disclosed herein provides a method for transporting in unison a stack of substantially flat sheets, the length and width of the sheets being within predetermined ranges. More specifically, the method includes the steps of: providing a sleeve for internally accommodating said stack of sheets; placing said stack of sheets in the sleeve; and providing a fluid stream in the sleeve, whereby the fluid stream moves the stack in unison along the length of the sleeve.

The invention disclosed herein may also provide a method for registering a stack of sheets with respect to perpendicularly relates axes, the sheets having length and width dimensions within predetermined ranges. This method includes the steps of: providing a sleeve for internally accommodating said stack of sheets, at least one point on an inner narrow wall of the sleeve being aligned in parallel with one of the axes; providing a stop at one end of the sleeve, the stop having at least one point aligned in parallel with the other of the axes; placing said stack of sheets in the sleeve; and providing in the sleeve a fluid stream having velocity components normal to each of the axes, whereby the stream moves each of the sheets into abutment with said points.

With the method set forth above registration of randomly disposed sheets of different sizes may be achieved.

Additional objects and features of the invention will become apparent by reference to the following description in conjunction with the accompanying drawings, in which.

Figure 1:
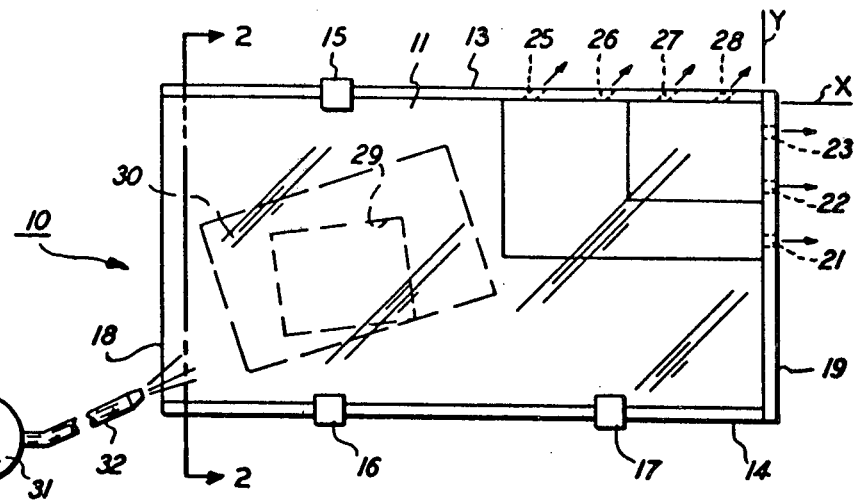
FIG. 1 is a top plan view of registration apparatus used in a method for transporting sheets, according to the invention, sheets being shown therein in unregistered positions (dotted lines) and in a registered position.
Figure 2:
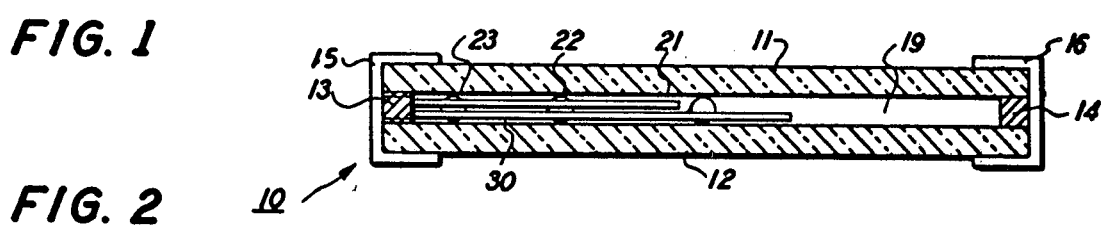
FIG. 2 is a cross-sectional view of the registration apparatus, taken along 2-2 in FIG. 1.

Registration apparatus 10 used in a method according to the invention is shown in FIGS. 1 and 2. Typically, the apparatus includes a pair of structurally identical rectangular plates 11 land 12, a pair of elongated rectangular members 13 and 14 disposed between the plates along longitudinally extending edges, and clamps 15–17 for holding the plates and elongated members together to form a rectangular sleeve. The plates are vertically aligned, and the elongated members are coterminous with the plates at one end 18 and at the other end provide a pair of recesses into which a stop 19 is inserted and secured. The stop 19 includes a plurality of ports 21–23 communicating with the space in the sleeve, the ports in the top and sleeve being located adjacent a common corner. The plates, the elongated members, and the stop are assembled in a fluid tight manner, such that fluid entering through the open end of the sleeve moves towards the common corner and exits through the ports. The stop is perpendicularly disposed with regard to the elongated members and, therefore, the common corner may be aligned with X and Y axes. The top and bottom plates are spaced from each other by approximately one-sixteenth of an inch, and sheets of paper 29 and 30, which are smaller than the length and width of the space in the sleeve, may be inserted therein as is indicated by the dotted lines. If, thereafter, a pump 31 and nozzle 32 direct fluid into the open end of the sleeve, the fluid flow through the sleeve will float the sheets into registration at the common corner. To move the sheets out of registration, the horizontally disposed sleeve may be tilted or a fluid stream may be injected into the sleeve 10 through one or more of the ports in the stop 19. In this embodiment, the top and bottom plates are manufactured from glass. Thus, sheets, such as transparencies, brought into registration may be read, may be photographed, may be projected, or may be scanned with suitable equipment. Although the length to width ratio shown in FIG. 1 is about 2:1, it should be noted that higher ratios may be used. Further, stop 19 may be designed so as to be removable to provide access to the registered sheets.

The registration apparatus disclosed above may be modified or supplemented in a number of ways, some of which are set forth below. In describing the various embodiments similar reference numerals will be used to designate components previously described.

Figure 3:
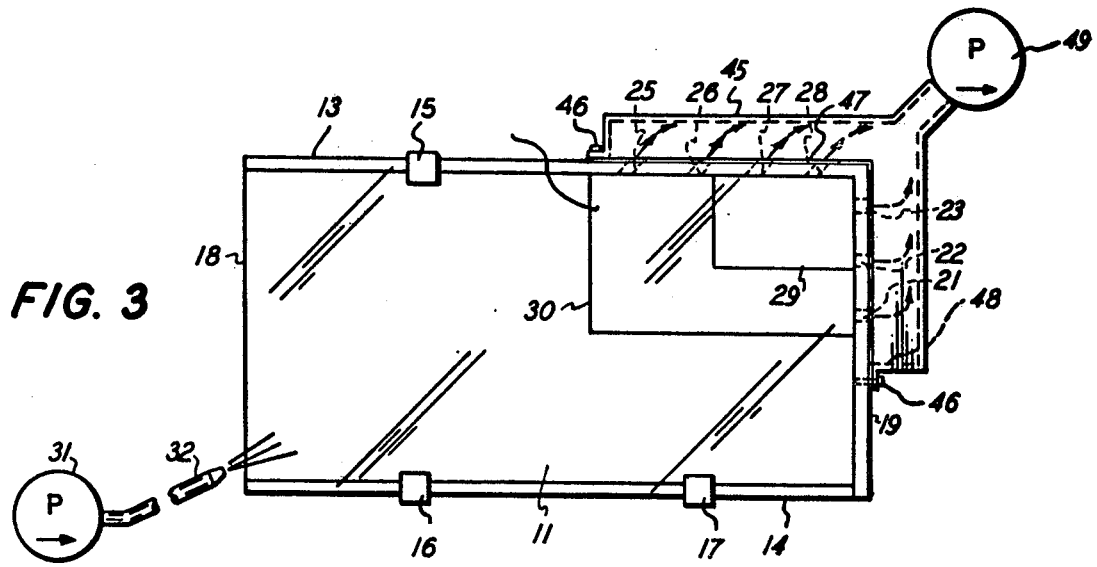
FIG. 3 is a top plan view of another embodiment of registration apparatus used in a method for transporting sheets, according to the invention, sheets being shown therein in unregistered positions (dotted lines) and in a registered position.
Figure 4:
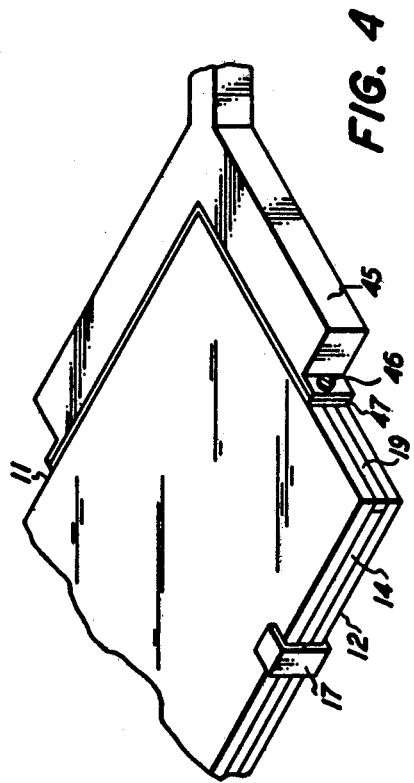
FIG. 4 is a partial perspective view of the registration apparatus shown in FIG. 3.

Referring to FIGS. 1, 3, and 4, it may be seen that the registration apparatus disclosed in FIGS. 3 and 4 differs from that shown in FIG. 1 in that a manifold 45 is fastened with screws 46 to the elongated member 13 and stop 19. A gasket 47 is interposed between the manifold 45 and the sleeve to prevent fluid leakage. The ports 25-28 in the elongated member and ports 21-23 in the stop communicate with a chamber 48 in the manifold, and the chamber in the manifold communicates with a vacuum pump 49. With this arrangement the flow of fluid through the sleeve may be accellerated to more rapidly register sheets 29 and 30 inserted through the open end of the sleeve. If desired, the pump 31 and nozzle 32 may be dispensed with and the sheets may be registered with the vacuum pump 49. Thus, it may be seen that sheets may be registered with a pressure pump, with a vacuum pump or with both. Although only two sheets have been shown in the sleeve a greater number of stacked sheets may be placed in the sleeve for transportation. Obviously, the greater the number of sheets, the greater the separation between the plates 11 and 12 must be to permit the injected fluid to move the sheets in unison and into registration.

Figure 5:
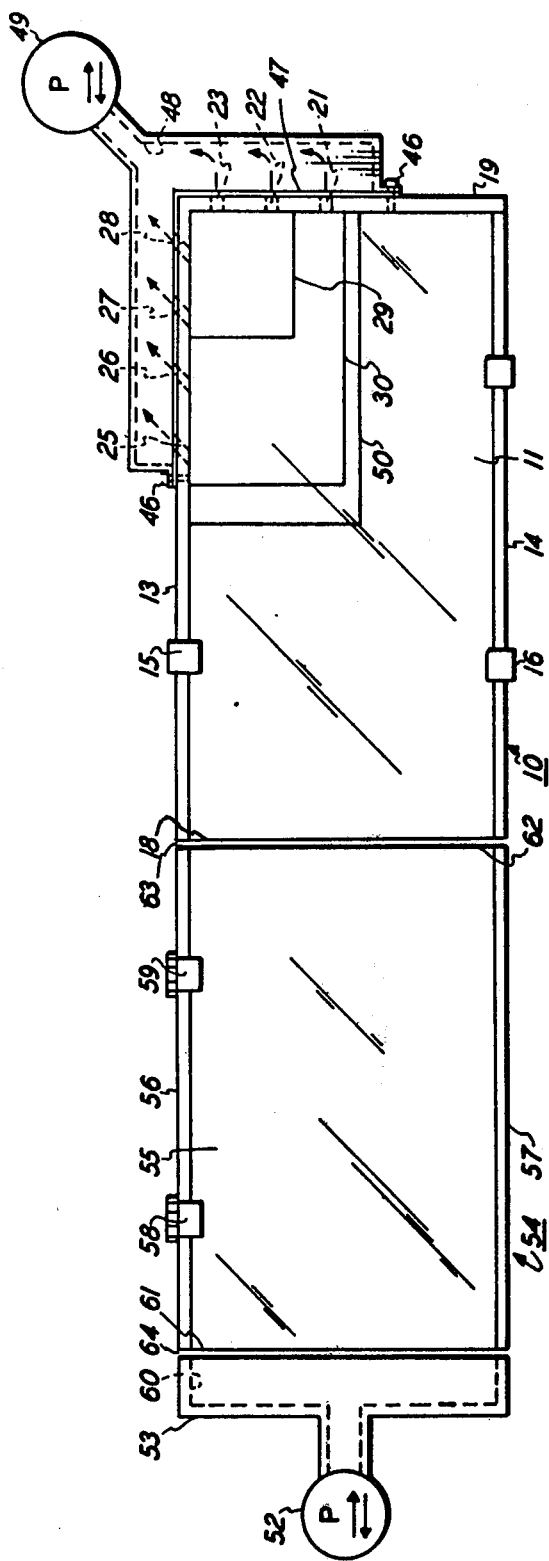
FIG. 5 is a top plan view of still another embodiment of registration apparatus used in a method for transporting sheets, according to the invention sheets being shown therein in registered positions.

Referring to FIGS. 3 and 5, it may be seen that FIG. 5 shows apparatus which differs from that which is shown in FIG. 3 only in that the pump 31 and nozzle 32 have been replaced with a pump 52, a manifold 53 coupled to the pump 52, and another sleeve 54 located between the manifold 54 and sleeve 10. Typically, sleeve 53 includes a pair of identical rectangular plates 55 (only one shown in view of FIG. 5), a pair of elongated rectangular members 56 and 57 fixed to the plate which is not shown and hinges 58 and 59 for pivotally holding plate 55 in contact with members 56 and 57. The plates are vertically aligned and the elongated members 56 and 57 are coterminous with the open ends of the sleeve. manifold 53 and sleeve 54 are located such that a chamber 60 is aligned with the space in the sleeve along one of its ends 61 and the other end 62 is aligned with end 18 of sleeve 10. While a gap 63 between ends 18 and 62 is not necessarily desirable, as more fully discussed below, it may be contended with.

If plate 55 is temporarily lifted and a stack of sheets 29, 30, 50 is rested on the other of the rectangular plates the stack may be transported in unison from sleeve 54 to sleeve 10 and moved into registration by causing pump 49 to create a vacuum pressure in manifold 48. More specifically, the vacuum pressure causes air to move into sleeve 54 at end 61 and causes air to move into sleeve 10 from sleeve 54 and from air surrounding the gap 63. The air flowing from sleeve 57 to sleeve 10 moves the sheets and the air entering through gap 63 prevents abutment of the end sheets of the stack with edge 18. If desired, pump 52 may be used to accelerate movement of the stack by causing it to provide, via manifold 53, a jet of air into sleeve 54. However, the flow of such air should not be great enough to cause air to exit through gap 63 because such flow would tend to drive the top and bottom sheets of the stack into engagement with the top and bottom plates. Registered sheets may be moved from sleeve 10 to sleeve 57 by reversing the pumps 49 and 52, care being taken to avoid having pump 49 delivering air at such a high level as to cause a net outward flow of air through gap 63.

In essence, sleeve 54 is a loading station which may be constructed in a number of ways. For example, the sleeve may be a unitary structure and manifold 53 may be movable to allow loading through end 61. Other structural details and methods of, for example, loading may be devised within the spirit of the subject invention. Therefore, it is to be understood that the methods and apparatus set forth herein are not to be constructed or interpreted as limitations on the claims which follow and define the invention.

What is claimed is:

1. A method for registering a stack of sheets with respect to perpendicularly related axes, the sheets having length and width dimensions within predetermined ranges, comprising the steps of:
    (a) providing a sleeve for internally accommodating said stack of sheets, at least one point on an inner narrow wall of the sleeve being aligned in parallel with one of the axes;
    (b) providing a stop at one end of the sleeve, the stop having at least one point aligned in parallel with the other of the axes;
    (c) placing said stack of sheets in the sleeve; and
    (d) providing in the sleeve a fluid stream having velocity components normal to each of the axes, whereby the stream moves the stack of sheets in the sleeve in unison and into abutment with said points.

2. A method as defined in claim 1 wherein the fluid stream is provided by placing at least one port in the stop and at least one port in the narrow wall; and by injecting fluid into the sleeve.

3. A method as defined in claim 1 wherein the fluid stream is provided by placing at least one port in the stop and at least one port in the narrow wall; and by drawing fluid from the sleeve through at least some of said ports.

4. A method for registering a stack of sheets with respect to perpendicularly related axes, the sheets having length and width dimensions within predetermined ranges, comprising the steps of:
    (a) providing a first sleeve for internally accommodating said stack of sheets, at least one point on an inner narrow wall of the sleeve being aligned in parallel with one of the axes, said narrow wall including at least one port;
    (b) providing a stop at one end of the sleeve, the stop having at least one point aligned in parallel with the other of the axes and at least one port;
    (c) aligning a second sleeve adjacent to the other end of the first sleeve;
    (d) placing the stack in the second sleeve;
    (e) providing in the sleeves a fluid stream, the stream having velocity components normal to each of the axes, whereby the stream moves each of the sheets into abutment with said points on the first sleeve, fluid being injected into the second sleeve and cooperating with drawing of fluid through the ports in the stop and narrow wall to provide the fluid stream, the injection and drawing of fluid being balanced to provide a net flow of fluid into the first sleeve from the space surrounding a gap between the first sleeve and the second sleeve.

* * * * *